United States Patent
Bijker (10) Patent No.: US 11,944,031 B2
(45) Date of Patent: Apr. 2, 2024

(54) PRODUCE HARVESTING APPARATUS AND PRECISION FARMING SYSTEM

(71) Applicant: Agri Technovation (Pty) Ltd, Klapmuts (CA)

(72) Inventor: Albert Hendrik Bijker, Klapmuts (ZA)

(73) Assignee: Agri Technovation (Pty) Ltd, Klapmuts (ZA)

( * ) Notice: Subject to any disclaimer, the term of this patent is extended or adjusted under 35 U.S.C. 154(b) by 806 days.

(21) Appl. No.: 16/976,488

(22) PCT Filed: Feb. 28, 2019

(86) PCT No.: PCT/ZA2019/050008
§ 371 (c)(1),
(2) Date: Aug. 28, 2020

(87) PCT Pub. No.: WO2019/169413
PCT Pub. Date: Sep. 6, 2019

(65) Prior Publication Data
US 2021/0360848 A1    Nov. 25, 2021

(30) Foreign Application Priority Data
Feb. 28, 2018  (ZA) .................................. 2018/01375

(51) Int. Cl.
*A01B 79/00* (2006.01)
*A01D 1/00* (2006.01)
(Continued)

(52) U.S. Cl.
CPC .............. *A01D 1/14* (2013.01); *A01B 79/005* (2013.01); *A01G 3/02* (2013.01); *H01H 36/0033* (2013.01)

(58) Field of Classification Search
CPC . A01D 1/14; A01D 1/00; A01D 45/00; A01D 41/127; A01D 41/1271;
(Continued)

(56) References Cited

U.S. PATENT DOCUMENTS 8,138,479 B2 *   3/2012  Kothari .................  H05B 47/115
                                                        250/353
2013/0055575 A1 * 3/2013  Delmas ...................  B26B 15/00
                                                        318/647
(Continued)

FOREIGN PATENT DOCUMENTS

DE      8814543      1/1989
EP      1842632     10/2007
(Continued)

OTHER PUBLICATIONS

International Search Report and the Written Opinion dated Feb. 11, 2020 From the International Searching Authority Re. Application No. PCT/ZA2019/050008. (8 Pages).
(Continued)

*Primary Examiner* — Jeffrey P Aiello (57) ABSTRACT

This invention relates to a precision agriculture produce harvesting system and produce harvesting apparatus configured for integration with the system, an essential feature of which is a harvesting device subsystem (100) that includes a harvesting device, for instance pruning shears (102) and a harvesting separation stroke detector (108) housed within a control module housing (110) mounted to the shears (102). A person operating the pruning shears (102) produces discernible separation strokes when the handles (104) of the shears (102) are squeezed together to produce a shearing action. The stroke detector (108) detects the separation strokes of the shears (102). By the addition of the control module (108) to the pruning shears (102), the shears are essentially converted into a data logging device by means of which important aspects of a produce harvesting process can be digitised and supplied to a harvest data digital data processing system.

8 Claims, 5 Drawing Sheets

(51) Int. Cl.
*A01D 1/14* (2006.01)
*A01D 45/00* (2018.01)
*A01D 46/24* (2006.01)
*A01G 3/00* (2006.01)
*A01G 3/02* (2006.01)
*G06Q 50/02* (2012.01)
*H01H 36/00* (2006.01)

(58) Field of Classification Search
CPC .... A01B 79/005; A01G 3/02; H01H 36/0033; Y02A 40/10; G05B 23/0221; G05B 23/0283; G05B 19/41865; G06N 20/00; G06N 3/02; G06N 3/126; G06Q 50/02; G06Q 50/00
USPC ......... 172/2; 340/429, 539.1; 701/50; 702/2, 702/5, 188, 141, 1, 33, 182, 145, 19, 189, 702/187
See application file for complete search history.

(56) References Cited

U.S. PATENT DOCUMENTS

| | | | | |
|---|---|---|---|---|
| 2015/0278719 | A1* | 10/2015 | Schueller | G06Q 10/063 705/7.11 |
| 2016/0071223 | A1* | 3/2016 | Rupp | A01B 79/005 705/7.11 |
| 2017/0055432 | A1* | 3/2017 | Graham | A01B 79/005 |
| 2017/0176595 | A1* | 6/2017 | McPeek | G01N 33/025 |

FOREIGN PATENT DOCUMENTS

| | | |
|---|---|---|
| EP | 3141107 | 3/2017 |
| FR | 3063866 | 9/2018 |
| JP | 2004133498 A * | 4/2004 |
| WO | WO 2019/169413 | 9/2019 |

OTHER PUBLICATIONS

Supplementary European Search Report and the European Search Opinion dated Oct. 13, 2021 From the European Patent Office Re. Application No. 19760424.2. (8 Pages).

* cited by examiner

PRODUCE HARVESTING APPARATUS AND PRECISION FARMING SYSTEM

RELATED APPLICATIONS

This application is a National Phase of PCT Patent Application No. PCT/ZA2019/050008 having International filing date of Feb. 28, 2019, which claims the benefit of priority of South African Patent Application No. 2018/01375 filed on Feb. 28, 2018. The contents of the above applications are all incorporated by reference as if fully set forth herein in their entirety.

FIELD AND BACKGROUND OF THE INVENTION

This invention relates to precision agriculture and, in particular, to a precision agriculture produce harvesting system and produce harvesting apparatus configured for integration with the system.

Precision agriculture, sometimes referred to as site specific crop management, is an agricultural system based on observations and measurements of inter- and infra-field variability in crops with a view to providing a decision support system for whole farm management that optimises returns on inputs while preserving resources. Typical systems adopt a phytogeomorphological approach which ties crop growth characteristics to topological terrain attributes, on the understanding that geomorphology typically dictates the hydrology of the farm under management. The practice of precision agriculture has been enabled by the advent of satellite navigation systems which allow the creation of maps of the spatial variability of as many farm and field variables as can be measured (e.g. crop yield, terrain features/topography, organic matter content, moisture levels, nitrogen levels, pH, mineralogical content and more). Additional data is often collected by sensor arrays mounted on GPS-equipped harvesting apparatus, such as combine harvesters. These arrays consist of real-time sensors that measure anything from plant chlorophyll levels to multispectral imagery. This data is used, often in conjunction with satellite imagery, to program and drive variable rate resource application apparatus, such as seeders, sprayers and the like to optimise the distribution of resources.

It is an object of this invention to provide a precision agriculture produce harvesting system and produce harvesting apparatus configured for integration with the system.

SUMMARY OF THE INVENTION

According to this invention, a produce harvesting system a harvesting device subsystem comprising a manual individual harvesting device configured for attachment to the person of the harvester, the harvesting device including programmable logic means and a separation stroke detector comprising a harvester motion transducer configured, in use, to monitor the motion of the harvester and to detect a harvester motion consistent with a predetermined produce separation stroke by means of which the harvester separates the harvested produce from a produce-producing organism in use, the programmable logic means being programmed to record each detected produce separation stroke in a separation stroke counter.

A manual harvester is a person who harvests produce manually, by separating the produce from the produce-producing organism, typically by means of a hand-held implement.

The hand-held implement is the manual individual harvesting device, which is configured for attachment to the person of the harvester either by actual attachment or by the person holding onto the harvesting device or hand-held implement and manipulating the implement manually.

The motions consistent with manual harvester produce separation strokes will vary from harvester to harvester and from time to time for an individual harvester and the harvesting device programmable logic means could therefore be programmed to monitor for and detect a large number of typical produce separation strokes.

The programming process could involve machine learning processes by means of which the harvesting device programmable logic means could be "trained" in situ, on large numbers of harvesters and on individual harvesters to detect a statistically significant number of produce separation strokes accurately and without creating false positives.

In the embodiments of the invention illustrated in this specification, the produce harvesting system includes a harvesting device for instance a pair of pruning shears, that is operable to separate an item of produce from a produce-producing organism in a discernible separation stroke, the harvesting device including a detector configured to detect separation strokes of the harvesting device, such as the shearing, cuffing or clipping action of a shearing tool.

Not all produce is harvested by means of cutting or shearing implements and the invention is therefore not restricted to cutting and shearing implements.

The invention extends, for instance, to a produce harvesting system in which the harvesting device is constituted by a motion transducer configured, in use, to monitor the physical motions of the harvester and to detect one and preferably many harvester motions consistent with a predetermined produce separation stroke by means of which the harvester separates the harvested produce from the produce-producing organism, for instance by picking or plucking the produce from the organism.

The harvesting device programmable logic means is preferably configured autonomously to record produce separation strokes detected by the separation stroke detector over a predetermined period of time, the programmable logic means including a digital data store configured to receive, store and permit retrieval of the data stored in the data store.

In this form of the invention, the harvesting device includes time of day and geospatial location means, the device programmable logic means being configured to record harvesting data in respect of every separation stroke detected by the stroke detector, the harvesting data including data pertaining to the detected separation stroke, the time of day when each individual separation stroke is made and the geospatial location at which the stroke was made.

The produce harvesting system of the invention includes, in addition to the harvesting device, a produce harvesting management system including programmable logic means programmed to record, store and display the digital data produced by the detected separation stroke records of a plurality of harvesting devices according to the invention.

The produce harvesting management system, in this way, constitutes a subsystem of the produce harvesting system of the invention and, in the preferred form of the invention, is implemented on a server computer.

By the same token, the harvesting device itself is essentially a subsystem of the produce harvesting system of the invention, but the invention nevertheless includes the harvesting device separately and apart from the overall system.

In addition, the produce harvesting system of the invention includes additional subsystems, such as charging and communications base stations, each configured for interfacing with a harvesting device, for electrical charging of an electrical battery included in the harvesting device.

The produce harvesting system is configured for communications and whilst the harvesting devices might be configured to communicate directly with the management system server, the harvesting device and base station subsystems are preferably configured for communications to take place from the harvesting device to the base station and from the base station to the management system server.

Shear-type harvesting devices typically consist of opposed pivoted blades that are pivoted together to slide against one another upon operation by means of handles opposite the pivot. The shearing action between the blades cuts material located between the blades during operation, in this case the harvested produce or, more specifically, the part of the organism securing the harvested produce to the organism.

The pivoted shearing action of the blades of shear-type harvesting devices is readily discernible and a number of transducers or sensors are available that can be used to detect the separation strokes of these types of harvesting devices.

It will be appreciated that a multiplicity of harvesting devices, not necessarily limited to cutting or shearing devices, share the characteristics of using a readily discernible separation stroke to separate the harvested produce from the produce-producing organism and the examples described herein are not intended to limit the invention to cutting or shearing devices.

In the preferred form of the invention, which is described in this specification, the harvesting device is a pair of pruning shears or secateurs that are operable by an operator to separate items of produce (oranges in the examples) from the produce-producing organism (orange trees in the examples). The operating strokes of pruning shears constitute a readily discernible shearing action by means of which the stem of the fruit is sheared from the tree.

The detector included in the harvesting device is configured to detect the separation strokes of the harvesting device and the harvesting device programmable logic means is programmed to record the detected separation strokes.

In this way, the harvesting device of the invention becomes a data logging device that, in the preferred form of the invention, is configured autonomously to detect and record separation strokes of the device over a predetermined period of time.

Every detected separation stroke is counted and the stroke count is stored, preferably as digital data recording at least a count of separation strokes and the time of day when each individual separation stroke is made, in a digital data store included in the device programmable logic, which is configured to permit retrieval or transmission of the digital data for viewing and evaluation after it has been recorded.

The separation stroke detector could be as simple as an electromechanical switch, for instance a microswitch, that switches from ON to OFF, or vice versa, with every separation stroke of the harvesting device.

In the preferred form of the invention, the stroke detector is preferably constituted by a magnetic reed switch that is positioned to switch in dependence of the proximity or otherwise of a magnet that is mounted for movement into and out of the proximity of the reed switch with every separation stroke of the harvesting device.

An alternative would be a gap sensor (also sometimes referred to as a photo interrupter, photogate, photodiode or phototransistor). A photo interrupter typically consists of an optical package that includes a light emitting element (typically an infrared LED) and an opposed, aligned photodetector element. The elements face each other across a spacing gap that defines a free space optical path. The photo interrupter is mounted on the harvesting device in such a way that a moving part of the device (a part that moves during the separation stroke) or an interrupter mounted on the moving part, interrupts or un-interrupts the optical path with every separation stroke, in effect operating as a light activated switch. Unlike mechanical switches, photo interrupters are non-contact, optical switches, improving reliability by preventing wear-and-tear due to abrasion on contact.

As an alternative or in addition to the switch-type stroke detectors referred to above, the separation stroke detector could also include or be constituted by one or more accelerometers mounted to the harvesting device and configured to detect the acceleration signature typical of the relevant separation stroke.

In such an implementation, the separation stroke of the harvesting device is likely to have a typical acceleration signature.

In this embodiment of the invention, the typical acceleration signature of the harvesting device separation stroke is preferably determined and stored in the harvesting device programmable logic means, which is preferably programmed to compare the acceleration signature of an assumed separation stroke executed by the harvesting device to the stored signature to determine the likelihood of the assumed separation stroke being an actual separation stroke.

This embodiment of the invention could be combined with the switch-type embodiments of the invention to provide a high likelihood of an assumed separation stroke being an actual obstacle stroke, thereby to remove false positives that could arise with switch-only stroke detectors, which are not set up to differentiate between actual separation strokes and movements of the device similar to separation strokes.

For instance, the shearing action of pruning shears cutting through the stem of an orange is likely to have a unique acceleration signature that is likely to be relatively similar across a plurality of stems. In contrast, simple opening and closing of the pruning shears, whilst capable of producing a positive signal in a switch-based stroke detector, is unlikely to produce the same signature in an accelerometer-type detector which, on its own, or in combination with a switch-type detector, is capable of screening out the false positives produced by simple opening and closing of the pruning shears.

The harvesting device subsystem of the invention preferably includes storage media and preferably non-volatile storage, one or more processors to implement the programmable logic means, and a power supply.

In the preferred form of the invention, the harvesting device subsystem preferably also includes a satellite navigation system, such as the Global Positioning System (GPS), GLONASS or the European Union's Galileo systems, to provide time and position data, including the GPS position of the harvesting device at the time of recordal of a separation stroke as well as the time of the separation stroke and its recordal.

In the preferred form of the invention, a number of the subsystems of the produce harvesting system are communications-enabled.

In the example illustrating the invention, as described in this specification, the harvesting device subsystem is constituted by an assembly of components, including the harvesting device and a control module that is either discrete from or incorporated in the harvesting device, the control module including a separation stroke detector, programmable logic means, data storage means, GPS and communication components and a power supply.

In the preferred form of the invention, the control module is a discrete subassembly that is removably mounted on the harvesting device.

In this way, the control module becomes a universal module—"universal" in the sense that it is designed for mounting to any one of a number of different shapes and sizes of harvesting devices.

The produce harvesting system of the invention includes a produce harvesting management subsystem which, in the preferred form of the invention, includes a server programmed to record, store and display the digital data produced by the harvesting devices.

Produce harvesting processes typically involve the harvested produce being picked, cut or otherwise removed from produce-bearing organisms, such as frees, vines or other plants. In manual harvesting processes in particular, the harvested produce is carried to produce transporting vehicles, normally in bags, boxes, crates or the like. At the vehicle, the produce is typically deposited by emptying the sling bags info produce bins which are transported to a processing warehouse where the produce is deposited, weighed, sorted (according to size, qualify or the like) and finally packed.

In the preferred form of the invention, multiple parts or sub-processes of the typical produce harvesting process are preferably incorporated in the produce harvesting system by incorporating communications enabling components info the relevant sub-processes, as illustrated and described in this specification.

BRIEF DESCRIPTION OF THE SEVERAL VIEWS OF THE DRAWINGS

The invention is further described with reference to the accompanying drawings in which.

DESCRIPTION OF SPECIFIC EMBODIMENTS OF THE INVENTION

The essential feature of the produce harvesting system of this invention is the harvesting device subsystem 100 illustrated in a number of the drawings. The harvesting device subsystem 100 includes a harvesting device and a harvesting separation stroke detector that, in effect, converts the harvesting device into a data logging device by means of which important aspects of a produce harvesting process can be digitised.

The harvesting device is manually operable to separate an item of produce from a produce-producing organism. In the example illustrated in the drawings, the harvesting device is constituted by pruning shears or secateurs 102 comprising handles or handles 104 that, when squeezed together, pivot the blades action. In this way, the pruning shears 102 are manually operable to separate an item of produce from a produce-producing organism by cutting the item of produce, for instance an orange, from the produce-producing organism which, in this case, would be an orange tree (neither of which is shown in the drawings).

Shears-type harvesting devices, such as the pruning shears 102, are typically used to remove stemmed produce, such as stemmed fruit (oranges, as described below, grapes, apples, lychees, tomatoes and more) and stemmed vegetables, such as watermelons, butternuts, pumpkins and the like) from the produce-producing organism by cutting or shearing.

As mentioned above, not all produce is harvested by means of cutting or shearing implements. A number of deciduous fruits are readily removable from the fruit tree, by picking or plucking, without the picking action damaging either the fruit or the stem. For these types of produce, the harvesting device need not monitor the stroke of a shears-type implement and the harvesting device could simply be a motion transducer configured to monitor the physical motions of the harvester and to detect harvester motions consistent with produce separation strokes, such as the harvester's picking or plucking actions.

The harvester (the person operating the harvesting device) operates the pruning shears 102 in readily discernible separation strokes. A separation stroke occurs when the handles 104 of the shears 102 are squeezed together so that the pivoted blades 106 of the shears 102 close and slide against one another to produce a shearing action. In the process, material located between the blades 106 is sheared or cut off. In this case, the sheared off material is the part of the organism securing the harvested produce to the organism. Using the example of an orange, the sheared off part will be the fruit stem that connects the orange to the tree.

The harvesting device subsystem 100 includes a control module 108, incorporating a separation stroke detector (not shown). The stroke detector is configured to detect the separation strokes of the shears 102.

Any number of stroke detector mechanisms could be used, including for instance the photo interrupter assembly described and illustrated in South African patent application no. 2018/01375 (on which this application is based).

The control module 108 illustrated in the drawings is housed within a control module housing 110 that incorporates the stroke detector, programmable logic means, a rechargeable battery and supporting electrical circuitry (none of which is shown in the drawings). The stroke detector is preferably constituted by a magnetic reed switch that is positioned to switch in dependence of the proximity or otherwise of a magnet.

The control module 108 is a discrete subassembly that is mounted on the pruning shears 102 by means of a stainless spring steel cradle that includes a pair of cradle arms 112.

The control module 108 is designed to constitute a universal module that is designed for mounting to any one of a number of different shapes and sizes of pruning shears or secateurs.

Most pruning shears or secateurs are a scissors-like devices with pivoting handles that are biased to the open position of their cutting blades by means of a compression spring, such as the spring 114 illustrated in the drawings. In most cases, the compression spring is mounted similarly to the mounting of the spring 114 of the pruning shears 102 of the drawings, which uses protruding mounting pins or nibs 116 that locate the spring 114 between the handles 104 by insertion of the nibs 116 into the open-ended coil of the spring 114 at either end thereof.

The control module 108 takes advantage of this spring mounting configuration. The free ends of the cradle arms 112 (the ends not secured to the control module housing 110) are bent over to define mounting tabs 118 that are angled to lie flat against the handles 104. Each tab 118 is formed with a stroke detector mounting aperture (not clearly shown) that can accommodate a nib 116. To secure the control module 108 to the pruning shears 102, the spring 114 is disengaged from the nibs 116 by over-compression of the spring 114. The tabs 118 of the cradle arms are then located between the handles 104, with the nibs 116 projecting through the mounting apertures formed in the tabs 118 and the spring 114 is replaced to hold the stroke detector 118 place between the handles 104.

To steady the control module 108 between the handles 104, the free ends of the cradle arms 112 are formed with side support plates 120.

A magnet 122 is mounted to one of the cradle arms 112.1 by means of a magnet housing 124. The magnet 122 is used to actuate the reed switch which is located, within the control module housing 110, in a position to detect and react to the proximity of the magnet 122 in use.

The handles 104, which are parts of the harvesting device/pruning shears 102 that move during the separation stroke, move the cradle arms 112 with every separation stroke of the pruning shears 102. This moves the magnet 122 info the proximity of the reed switch in the control module housing 110 with every separation stroke, of the pruning shears 102. In turn, this actuates the reed switch to output a switching signal with each separation stroke.

By the addition of the control module 108 to the pruning shears 102, the shears are essentially converted into a data logging device.

As with any data logging system, the harvesting device subsystem 100 is configured to operate as a digital data processing system by the inclusion, within the housing 110 of one or more microprocessors (programmable logic means), a power supply and a data store incorporated in appropriate storage media, preferably non-volatile digital data storage such as an EEPROM for instance.

Figure 6:
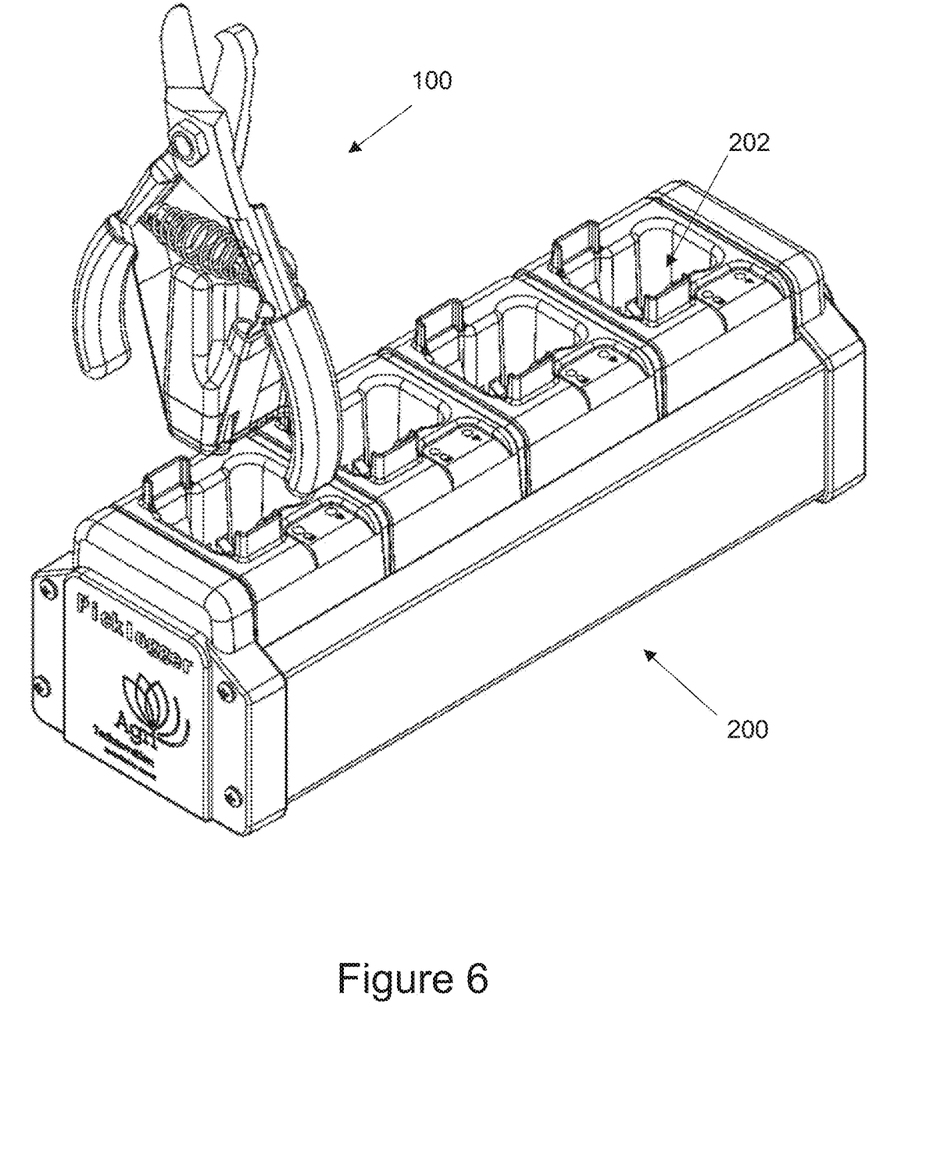
FIG. 6 is an isometric view of a charger base station for a plurality of the harvesting device subsystems of FIG. 1.

The control module 108 is powered by means of a rechargeable battery (not shown) that is recharged in the charging base station 200 illustrated in FIG. 6. The charging base station 200 includes electrical charging contacts located within receptacles 202 formed in the charging base station 200 that are shaped complementally to the external shape of the control module housing 110. The charging base station 200 is configured to accept the control module housing 110 on its own or connected to pruning shears 102.

In one form of the invention, the charging base station 200 may include a communications port and the charging base station 200 can be networked into a communications network including a central server computer. The charging base station 200, together with other similar base stations 200 may conveniently be located in a central location where the harvesters who operate the devices 100 will dock each harvesting device 100 with a base station on completion of the harvesting shift. Once docked in such a communications-enabled charging base station 200, the base station, besides charging the battery of the harvesting device 100 also extracts the data logged by the harvesting device 100 from the device data store and transmits the extracted data to the server.

The harvesting device subsystem 100 includes a satellite navigation system, preferably the Global Positioning System (GPS), to provide time and position data, the subsystem 100 being programmed to record, in respect of each separation stroke recorded, the GPS position of the harvesting device and the time the separation stroke was executed.

A number of the subsystems of the produce harvesting system are communications-enabled by means of communications protocols, preferably one or more of Near Field Communications (NFC), Bluetooth™ (particularly Bluetooth Low Energy—BLE) and 1-Wire™ protocols, singly or in combination.

In manual harvesting processes in particular, the typical produce harvesting process involves the harvested produce (an orange for instance) being cut manually from the produce-bearing organism (an orange tree in the example) by shearing off the stem connecting the orange to the tree with a cutter, such as the pruning shears 102. The fruit is cut from the tree by a harvester (the person operating the shears 102) and deposited into a sling bag carried by the harvester. When the sling bag is filled to capacity, the harvester carries the sling bag to a produce transporting vehicle, normally a tractor-drawn trailer, where the produce is deposited by the harvester emptying the sling bag info a produce bin on the trailer. When the produce bins on the trailer are filled to capacity, the produce bins are transported to a processing warehouse where the produce is deposited, weighed, sorted (according to size, qualify or the like) and finally packed.

Figures 1, 2:
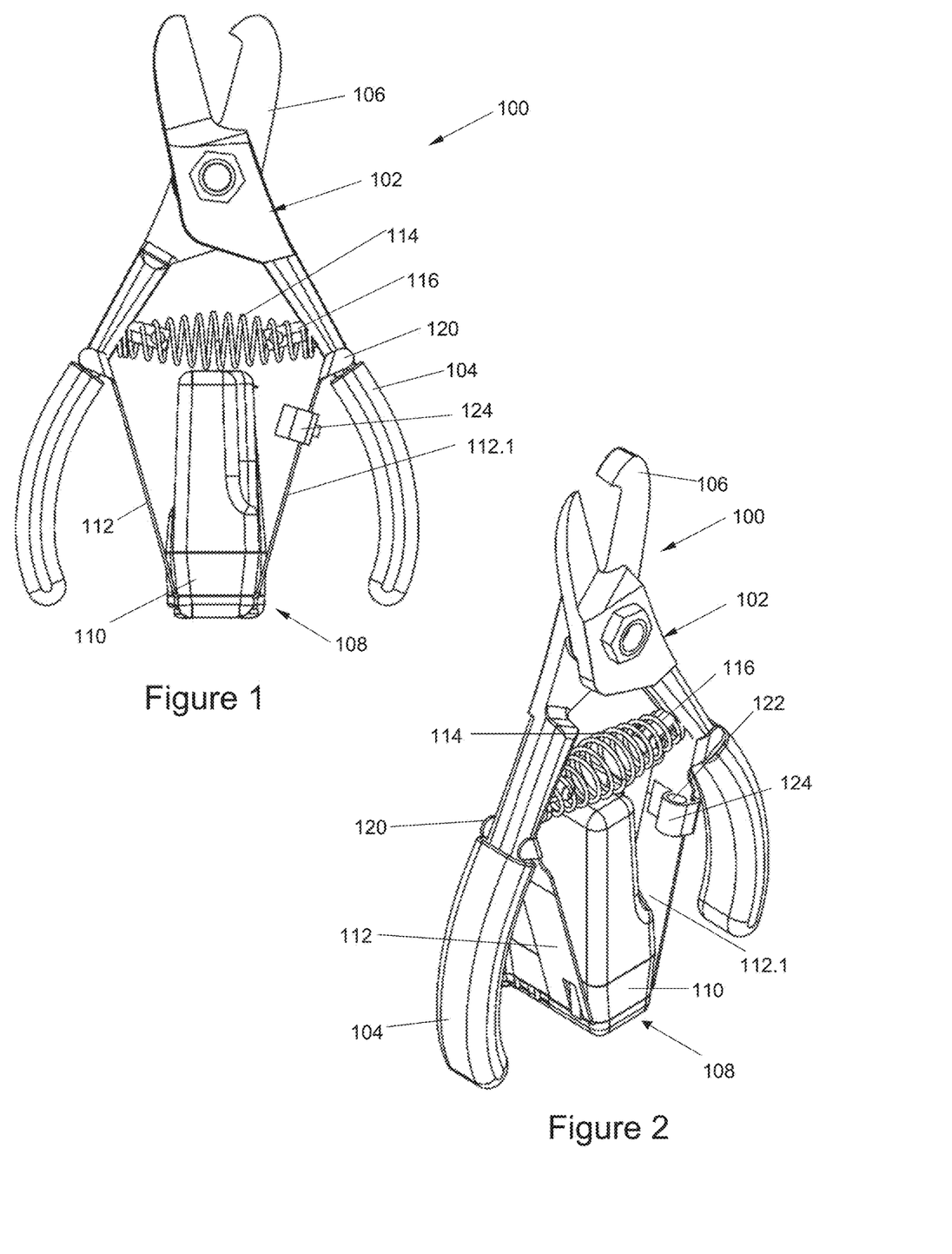
FIG. 1 is a front elevation of a pruning shears-based harvesting device subsystem forming part of a produce harvesting system according to the invention, the harvesting device subsystem being constituted by an assembly of components, including pruning shears and a separation stroke detector forming part of a control module mounted on the handles of the pruning shears.
FIG. 2 is an isometric view of the harvesting device subsystem of FIG. 1.
Figure 3:
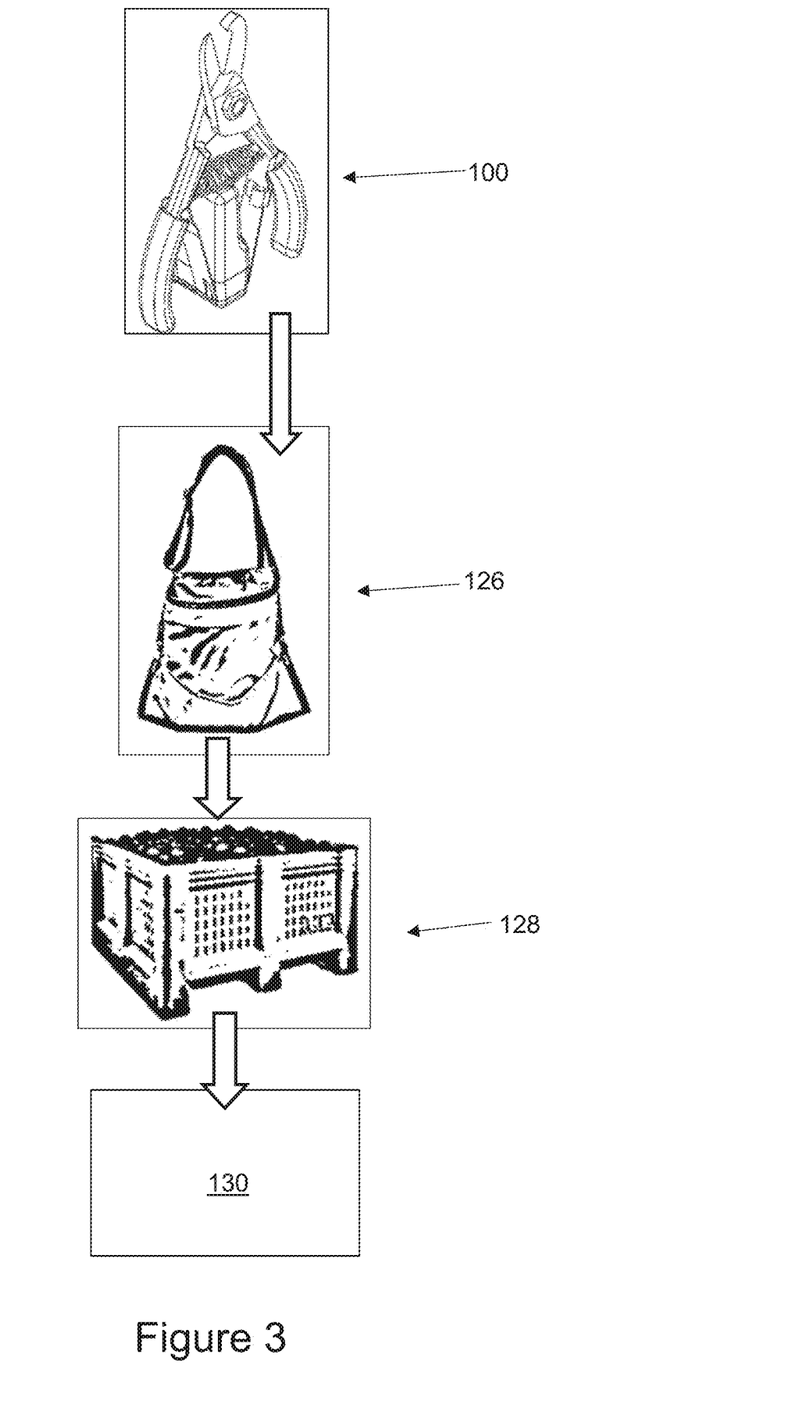
FIG. 3 is a block diagram representation of the major components of the produce harvesting system.
Figure 4:
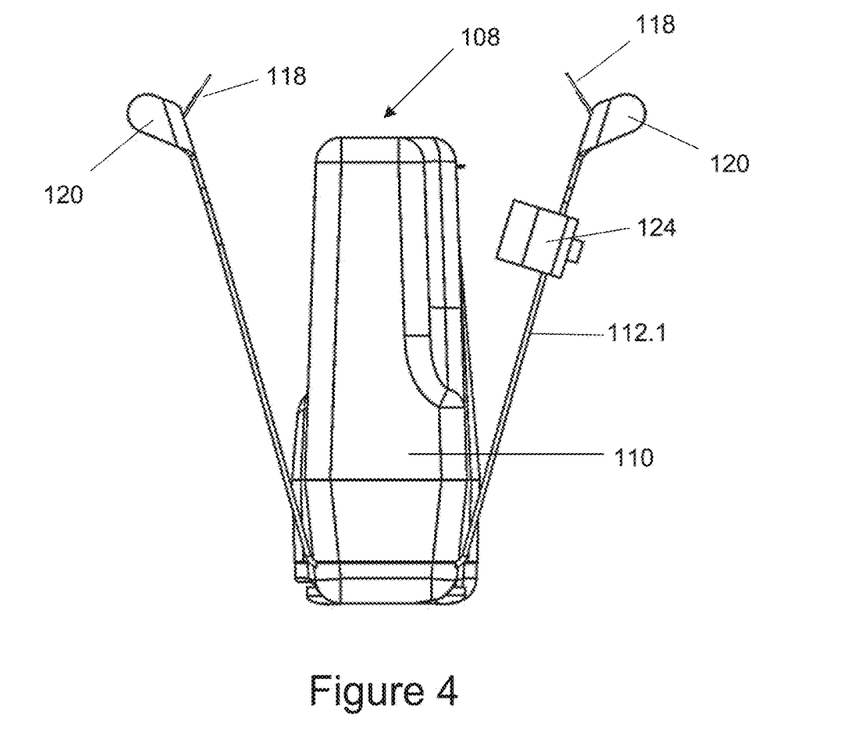
FIG. 4 is a front elevation of the control module separated from the harvesting device subsystem of FIG. 1.
Figure 5:
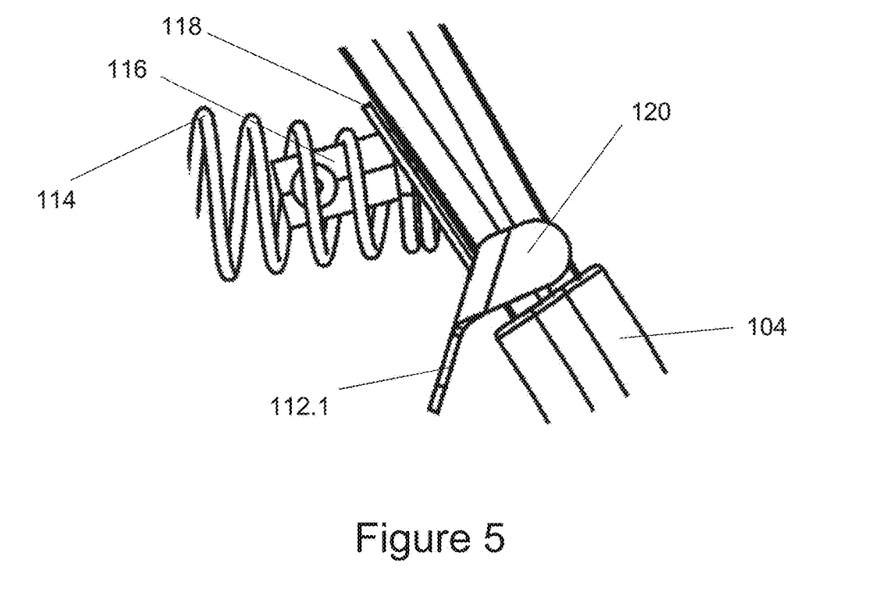
FIG. 5 is a detail taken from FIG. 1 that illustrates the mounting mechanism by means of which the control module of FIG. 4 is mounted on the pruning shears handles.

To facilitate modelling of this process in the management subsystem, a number of the elements used in the process are communications-enabled and the process is typically implemented along the lines of the workflow illustrated, diagrammatically, in FIG. 3.

In this workflow, the data logging pruning shears 102 are used by a harvester to cut the produce, manually, from the produce-bearing organism. In this case oranges are cut from an orange tree by shearing off the stem connecting the orange to the tree with the pruning shears 102. The separation stroke detector detects the stroke of the shears 102 separating the orange from the tree, by virtue of the magnet 122 actuating the reed switch in the control module 108. The reed switch signal is sent to the control module programmable logic means which is programmed to store the separation stroke in memory in the control module data store, together with the time and the GPS position of the pruning shears 102 at the time of the separation stroke. This data is referred to in this specification as "harvesting data".

The harvester deposits the cut fruit into a sling bag 126 carried by the harvester. Excluding the possibility of false positives, the stored number of separation strokes stored in memory in the data store should equate to the number of oranges harvested by the harvester.

When the bag 126 is filled to capacity, the harvester carries the sling bag 126 to a trailer (not shown), where the produce is deposited by the harvester emptying the sling bag 126 into one of a number of produce bins 128 on the trailer.

The produce bin 128 is communications-enabled and includes programmable logic means, including a data store. The control module 108 incorporates a communication device that is compatible with the bin communication device.

Upon emptying the sling bag 126 into the produce bin 128, the harvester scans the control module 108 to the produce bin communication device or the control module 108 and the produce bin 128 communication device communicate automatically.

Using the example of RFID communications, for instance, when the sling bag 126 is emptied into the bin 128, a control module RFID tag could tag into a bin RFID reader. Once communication is established, the control module programmable logic means is programmed to transfer (by moving or copying) the harvesting data stored in the control module data store to the produce bin data store.

When the produce bins 128 on the trailer are filled to capacity, the produce bins are transported to a processing warehouse (diagrammatically illustrated by a diagram box 130). The warehouse 130 is provided with programmable logic means and is communications-enabled to communicate automatically with the communications devices in the produce bins 128.

In the warehouse 130, each bin 128 is placed on a scale (not shown) where the produce is weighed. The warehouse communication means is preferably associated with the scale or scales used to weigh the bins 128. Once communication is established between a bin 128 and a scale, the warehouse programmable logic means is programmed to transfer (by moving or copying) the harvesting data stored in the bin programmable logic means to the warehouse programmable logic means, which might include a communications network, a central server computer and a data store for the storage of harvesting data communicated from produce bins 128 by way of the warehouse scales.

The central server computer could be the management system server.

Under conventional protocol, the produce bin 128, after weighing, is emptied into a sorting machine (not shown) which classifies the unpacked fruit into categories, typically based on one or more of size, quality, mass, colour, intended end-use or the like. The oranges of the example, for instance, are classified into categories including size, colour and quality, the latter determined by the intended end-use, for example export quality, domestic quality and juice quality.

In conventional practice, an unpacking report is prepared for the bin 128, in which this type of information is recorded in report format.

In the management system of the invention, the unpacking report data is uploaded to the management system server, which now has a digital data store including harvesting data and unpacking data, thereby incorporating data pertaining to almost every aspect of the harvesting process.

More importantly, the data is geographically mapped and includes the location of picking of the items of produce harvested, which data can be used to supplement the geographical data obtained by geographical surveys and stored in geographic information systems (GIS).

Figure 7:
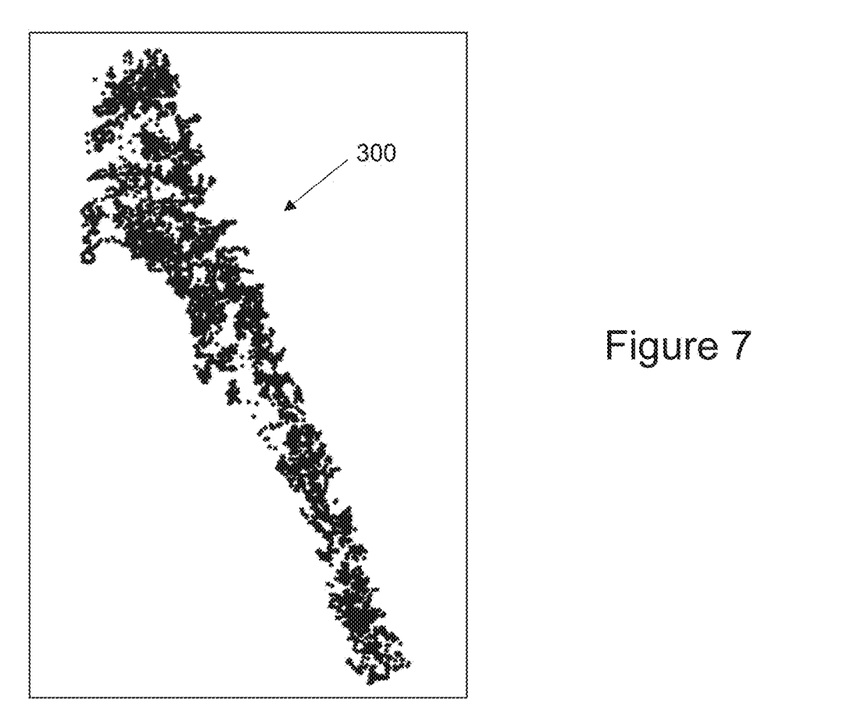
FIGS. 7 and 8 are diagrammatic graphical representations of data displays produced by means of the produce harvesting system of the invention.
Figure 8:
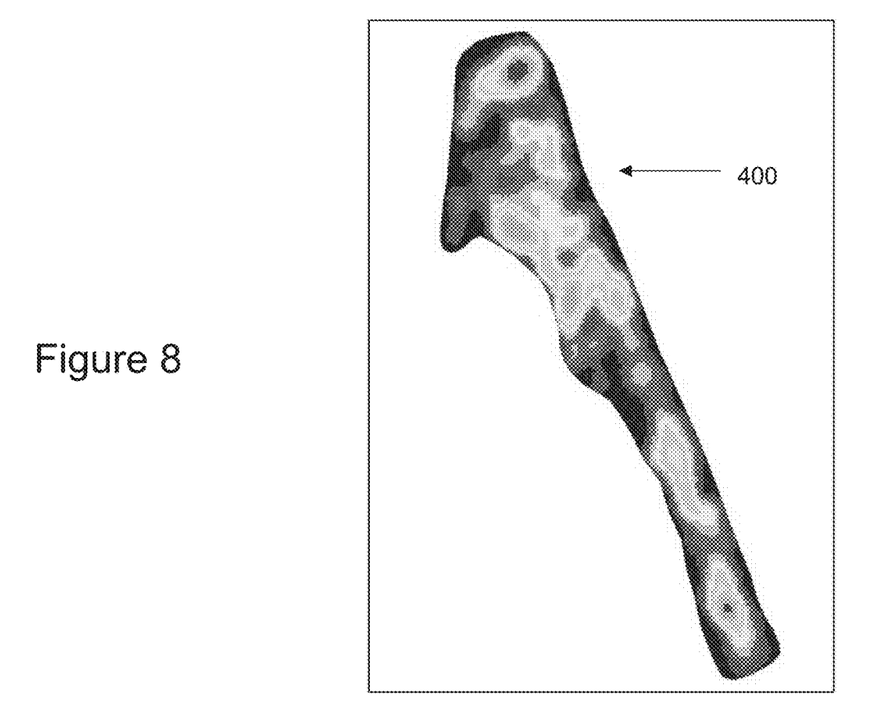

It is possible, using GIS, to analyse, manage and display the data geographically, for instance in the form of a cluster map 300 (FIG. 7) or a heat map 400 (FIG. 8), which is a graphical representation of the data where individual values (for instance weight values or quality values) are represented as colors. This makes it possible to determine characteristics of the farmland at a glance. For instance, in the example described above, it is possible to map and display which zones or trees in the orange grove produce greater or lesser yields, which allows for much more directed on-site inspections to determine and address the causes of yield variability, for instance by adjusting for sub-optimal irrigation, variable soil fertility, localised disease and more.

More granular reports than this are also possible. For instance, it is possible to produce an unpacking report for each bin 128 processed in the warehouse 130 and to map the unpacking data against GIS data to obtain per-bin quality maps, for instance.

The picking data is analogous to the machine data associated with the so-called second wave of precision agriculture—data aggregated by the machines typically used in applying resources to and harvesting produce from previously surveyed fields and farmland.

Precision agriculture systems supplement the survey data with machine data to optimise inter- and infra-field farmland management with regard to:

crop science—by matching farming practices more closely to crop needs (such as fertilizer inputs);

environmental protection—by reducing the environmental risks and footprint of farming (such as limiting leaching of nitrogen);

economics—by boosting competitiveness through more efficient practices (such as improved management of fertilizer usage and other inputs);

precision farming practices, including improved decision-making, greater traceability, and even enhancing the inherent quality of the produce.

The invention claimed is:

1. A produce harvesting device subsystem comprising:
an individual harvesting device; and
a control module that includes programmable logic means and a separation stroke detector that is configured, in use, to monitor the harvesting device and to detect an action of the harvesting device that is consistent with a predetermined produce separation stroke by means of which the harvesting device separates harvested produce from a produce-producing organism in use, the programmable logic means being programmed to record each detected produce separation stroke in a separation stroke counter,
wherein the harvesting device is a manually operable pivoted shear-type harvesting device, the control module is discrete from and removably mounted to the harvesting device, and the separation stroke detector is configured to monitor action of the harvesting device by monitoring when handles of the harvesting device are manually squeezed together to produce a pivotal shearing action.

2. The produce harvesting device subsystem of claim 1 in which the programmable logic means is configured autonomously to record produce separation strokes detected by the separation stroke detector over a predetermined period of time, the programmable logic means including a digital data store configured to receive, store and permit retrieval of the data stored in the data store.

3. The produce harvesting device subsystem of claim 2 in which the control module includes time of day and geospatial location means, the programmable logic means being configured to record harvesting data in respect of at least some of the separation strokes detected by the separation stroke detector, the harvesting data including data pertaining to the detected separation strokes, the time of day when the separation strokes are made and the geospatial location at which the strokes were made.

4. The produce harvesting device subsystem of claim 3, wherein the control module includes a produce harvesting management subsystem that is configured for communication with a plurality of harvesting device subsystems, the management subsystem including programmable logic means programmed to retrieve the harvesting data from a plurality of harvesting device subsystems and to store and manage the harvesting data.

5. The produce harvesting device subsystem of claim 1 in which the control module includes data storage means, geospatial location means, communication means and a power supply.

6. The produce harvesting device subsystem of claim 1 in which the stroke detector comprises a magnetic reed switch that is positioned to switch in dependence of the proximity of a magnet that is mounted for movement into and out of the proximity of the reed switch with every separation stroke of the harvesting device.

7. The produce harvesting device subsystem of claim 1 in which the stroke detector is constituted by a photodiode including a light emitting element and an opposed, aligned photodetector element that face each other across a spacing gap that defines a free space optical path, a photo interrupter being mounted on the harvesting device such that the optical path is affected with every separation stroke.

8. The produce harvesting device subsystem of claim 1 in which the separation stroke detector comprises an accelerometer mounted to the harvesting device, the accelerometer being configured to detect an acceleration signature predetermined as typical of a separation stroke of the harvesting device.

* * * * *

UNITED STATES PATENT AND TRADEMARK OFFICE
CERTIFICATE OF CORRECTION

Page 1 of 1

PATENT NO. : 11,944,031 B2
APPLICATION NO. : 16/976488
DATED : April 2, 2024
INVENTOR(S) : Albert Hendrik Bijker It is certified that error appears in the above-identified patent and that said Letters Patent is hereby corrected as shown below:

On the Title Page

In Item (71) Applicant, Line 2:
"CA"
Should be changed to:
--ZA--

Signed and Sealed this
Ninth Day of July, 2024

Katherine Kelly Vidal
*Director of the United States Patent and Trademark Office*